(12) United States Patent
Chun et al.

(10) Patent No.: US 8,761,078 B2
(45) Date of Patent: Jun. 24, 2014

(54) METHOD AND APPARATUS FOR SETTING A FRAME IN A WIRELESS COMMUNICATION SYSTEM COMPRISING A RELAY STATION

(75) Inventors: Jin Young Chun, Anyang-si (KR); Bin Chul Ihm, Anyang-si (KR)

(73) Assignee: LG Electronics Inc., Seoul (KR)

(*) Notice: Subject to any disclaimer, the term of this patent is extended or adjusted under 35 U.S.C. 154(b) by 108 days.

(21) Appl. No.: 13/393,146

(22) PCT Filed: Sep. 17, 2010

(86) PCT No.: PCT/KR2010/006394
§ 371 (c)(1),
(2), (4) Date: Feb. 28, 2012

(87) PCT Pub. No.: WO2011/034368
PCT Pub. Date: Mar. 24, 2011

(65) Prior Publication Data
US 2012/0155374 A1 Jun. 21, 2012

Related U.S. Application Data (60) Provisional application No. 61/243,541, filed on Sep. 18, 2009.

(30) Foreign Application Priority Data

Sep. 15, 2010 (KR) .................. 10-2010-0090272

(51) Int. Cl.
*H04B 7/14* (2006.01)
*H04J 3/08* (2006.01)
(52) U.S. Cl.
USPC ............. 370/315; 370/328; 370/501

(58) Field of Classification Search
None
See application file for complete search history.

(56) References Cited

U.S. PATENT DOCUMENTS

| 8,259,668 | B2 * | 9/2012 | Beems Hart et al. ......... 370/330 |
| 8,315,225 | B2 * | 11/2012 | Xu et al. ........................ 370/330 |
| 8,594,561 | B2 * | 11/2013 | Walke et al. ..................... 455/7 |
| 2007/0081483 | A1 * | 4/2007 | Jang et al. ..................... 370/315 |
| 2007/0086368 | A1 * | 4/2007 | Lee et al. ...................... 370/313 |
| 2007/0217367 | A1 * | 9/2007 | Lee et al. ...................... 370/335 |

(Continued)

OTHER PUBLICATIONS

Shkumbin Hamiti, "The Draft IEEE 802.16m System Description Document," IEEE 802.16m-08/003r3, Jun. 16, 2008 See section 11.4 "Frame Structure".

(Continued)

*Primary Examiner* — Ian N Moore
*Assistant Examiner* — Eric P Smith
(74) *Attorney, Agent, or Firm* — Mckenna Long & Aldridge LLP (57) ABSTRACT

Provided are a method and apparatus for setting a frame of a relay station in a wireless communication system. A base station sets an access zone frame and a relay zone frame adjacent the access zone frame. The access zone frame comprises a downlink (DL) access zone in which the base station or the relay station transmits a signal to a terminal, and an uplink (UL) access zone in which the terminal transmits a signal to the base station or to the relay station. The relay zone frame comprises a DL relay zone in which the base station transmits a signal to the terminal or to the relay station, and a UL relay zone in which the terminal or the relay station transmits a signal to the base station.

3 Claims, 9 Drawing Sheets

(56) References Cited

U.S. PATENT DOCUMENTS

| | | | |
|---|---|---|---|
| 2008/0107062 A1* | 5/2008 | Viorel et al. | 370/315 |
| 2008/0107073 A1* | 5/2008 | Hart et al. | 370/330 |
| 2010/0061354 A1* | 3/2010 | Maheshwari et al. | 370/338 |
| 2010/0080166 A1* | 4/2010 | Palanki et al. | 370/315 |
| 2010/0103860 A1* | 4/2010 | Kim et al. | 370/315 |
| 2011/0261749 A1* | 10/2011 | Youn et al. | 370/315 |
| 2011/0268004 A1* | 11/2011 | Doppler et al. | 370/311 |
| 2012/0230231 A1* | 9/2012 | Lim et al. | 370/280 |
| 2013/0223390 A1* | 8/2013 | Li et al. | 370/329 |

OTHER PUBLICATIONS

IEEE Std 802.16j-2009, "Part 16: Air Interface for Broadband Wireless Access Systems—Amendment 1: Multihop Relay Specification," Jun. 12, 2009 See section 8.4.4 "Frame Structure".

J. Sydir, et al., "An evolved cellular system architecture incorporating relay stations," IEEE Communications Magazine, pp. 115-121, Jun. 2009 See section "IEEE 802.16j: The First Relay Standard".

* cited by examiner

METHOD AND APPARATUS FOR SETTING A FRAME IN A WIRELESS COMMUNICATION SYSTEM COMPRISING A RELAY STATION

CROSS-REFERENCE TO RELATED APPLICATIONS

This application is a 35 U.S.C. 371 National Stage entry of International Application No. PCT/KR2010/006394, filed on Sep. 17, 2010, and claims the benefit of U.S. Provisional Application No. 61/243,541, filed on Sep. 18, 2009, and Korean Patent Application No. 10-2010-0090272, filed Sep. 15, 2010, all of which are incorporated by reference in their entirety herein.

BACKGROUND OF THE INVENTION

1. Field of the Invention

The present invention relates to a wireless communication system, and more particularly, to a method and apparatus for setting a frame in a wireless communication system including a relay station.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain. In order to support the various schemes described above, a control signal must be transmitted between a mobile station (MS) and a base station (BS). Examples of the control signal include a channel quality indicator (CQI) for reporting a channel state from the MS to the BS, an acknowledgement/not-acknowledgement (ACK/NACK) signal in response to data transmission, a bandwidth request signal for requesting allocation of a radio resource, precoding information in a multiple antenna system, antenna information, etc. The control signal is transmitted through a control channel.

A wireless communication system including a relay station (RS) has recently been developed. The RS is employed for cell coverage extension and transmission capability improvement. A BS provides a service to an MS located in a coverage boundary of the BS via the RS, and thus can obtain an effect of extending the cell coverage. In addition, the RS improves signal transmission reliability between the BS and the MS, thereby improving transmission capacity. The RS can be used when the MS is located in a shadow area even if the MS is located within the coverage gap of the BS.

The RS requires a radio resource region for DL transmission with respect to a relay MS connected to the RS. Further, since the RS receives a signal from the relay MS and thereafter decodes and transmits the signal to the BS, the RS requires a radio resource region for UL transmission. The RS can transmit a signal to an MS connected to the RS or can receive a signal from the BS in the same frequency band. Further, the RS can receive a signal from the MS connected to the RS or can transmit a signal to the BS in the same frequency band. Therefore, the RS requires a transition interval when switching a signal transmission/reception operation. In general, it is assumed that the RS cannot transmit or receive a signal in the transition interval.

Accordingly, a method for setting a frame such that a transition interval is included as little as possible to decrease a loss in which a signal cannot be received or transmitted due to the transition interval.

SUMMARY OF THE INVENTION

The present invention provides a method for setting a frame in a wireless communication system including a relay station and an apparatus for transmitting the frame.

In an aspect, a method for setting a frame of a relay station in a wireless communication system is provided. The method includes setting an access zone frame including a downlink (DL) access zone in which a base station or the relay station transmits a signal to a user equipment and an uplink (UL) access zone in which the user equipment transmits a signal to the base station or the relay station, and setting a relay zone frame adjacent to the access zone frame and including a DL relay zone in which the base station transmits a signal to the user equipment or the relay station and a UL relay zone in which the user equipment or the relay station transmits a signal to the base station. In a superframe including the access zone frame and the relay zone frame, an odd frame may be set to the access zone frame and an even frame may be set to the relay zone frame. In a superframe including the access zone frame and the relay zone frame, an odd frame may be set to the relay zone frame and an even frame may be set to the access zone frame. The access zone frame or the relay zone frame each may include 8 subframes. An advanced relay station-transmit/receive transition gap (ATS-TTG) may be allocated between a last DL subframe of the DL access zone and a first UL subframe of the UL access zone. An advanced relay station-receive/transmit transition gap (ARS-RTG) may be allocated between a last DL subframe of the DL relay zone and a first UL subframe of the UL relay zone.

In another aspect, an apparatus for transmitting a frame is provided. The apparatus includes a radio frequency (RF) unit for transmitting or receiving a radio signal, and a processor coupled to the RF unit, wherein the processor is configured for setting an access zone frame including a downlink (DL) access zone in which a base station or the relay station transmits a signal to a user equipment and an uplink (UL) access zone in which the user equipment transmits a signal to the base station or the relay station, and setting a relay zone frame adjacent to the access zone frame and including a DL relay zone in which the base station transmits a signal to the user equipment or the relay station and a UL relay zone in which the user equipment or the relay station transmits a signal to the base station. In a superframe including the access zone frame and the relay zone frame, an odd frame may be set to the access zone frame and an even frame may be set to the relay zone frame. In a superframe including the access zone frame and the relay zone frame, an odd frame may be set to the relay zone frame and an even frame may be set to the access zone frame. An advanced relay station-transmit/receive transition gap (ATS-TTG) may be allocated between a last DL subframe of the DL access zone and a first UL subframe of the UL access zone. An advanced relay station-receive/transmit transition gap (ARS-RTG) may be allocated between a last DL subframe of the DL relay zone and a first UL subframe of the UL relay zone.

In a wireless communication system including a relay station, the relay station can set a frame such that a loss caused by a transition interval can be minimized.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
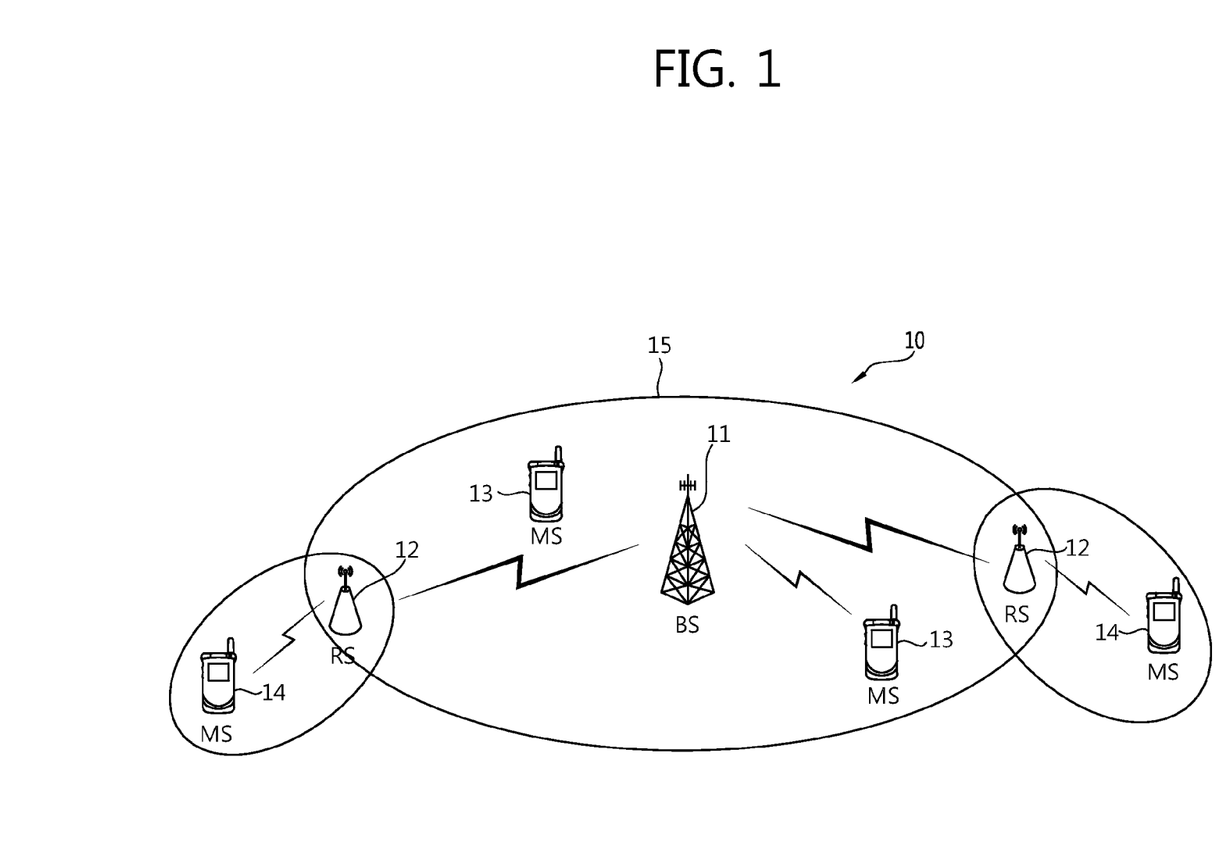
FIG. 1 shows a wireless communication system including a relay station.

FIG. 1 shows a wireless communication system including a relay station.

Referring to FIG. 1, a wireless communication system 10 including a relay station (RS) 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a mobile station (MS) 13 and may be referred to as another terminology, such as an evolved node-B (eNB), a base transceiver system (BTS), an access point, an access network (AN), an advanced BS (ABS), etc. The BS 11 can perform functions such as connectivity between the RS 12 and an MS 14, management, control, resource allocation, etc.

The RS 12 is a device for relaying a signal between the BS 11 and the MS 14, and is also referred to as another terminology such as a relay node (RN), a repeater, an advanced RS (ARS), etc. A relay scheme used in the RS may be either amplify and forward (AF) or decode and forward (DF), and the technical features of the present invention are not limited thereto.

The MSs 13 and 14 may be fixed or mobile, and may be referred to as another terminology, such as a an advanced mobile station (AMS), a user terminal (UT), a subscriber station (SS), a wireless device, a personal digital assistant (PDA), a wireless modem, a handheld device, an access terminal (AT), a user equipment (UE), etc. Hereinafter, a macro MS denotes an MS that directly communicates with the BS 11, and a relay MS denotes an MS that communicates with the RS. To improve a data transfer rate depending on a diversity effect, a macro MS 13 located in the cell of the BS 11 can also communicate with the BS 11 via the RS 12.

Between the BS and the macro MS, a downlink (DL) denotes communication from the BS to the macro MS, and an uplink (UL) denotes communication from the macro MS to the BS. Between the BS and the RS, a DL denotes communication from the BS to the RS, and a UL denotes communication from the RS to the BS. Between the RS and the relay MS, a DL denotes communication from the RS to the relay MS, and a UL denotes communication from the relay MS to the RS.

Figure 2:
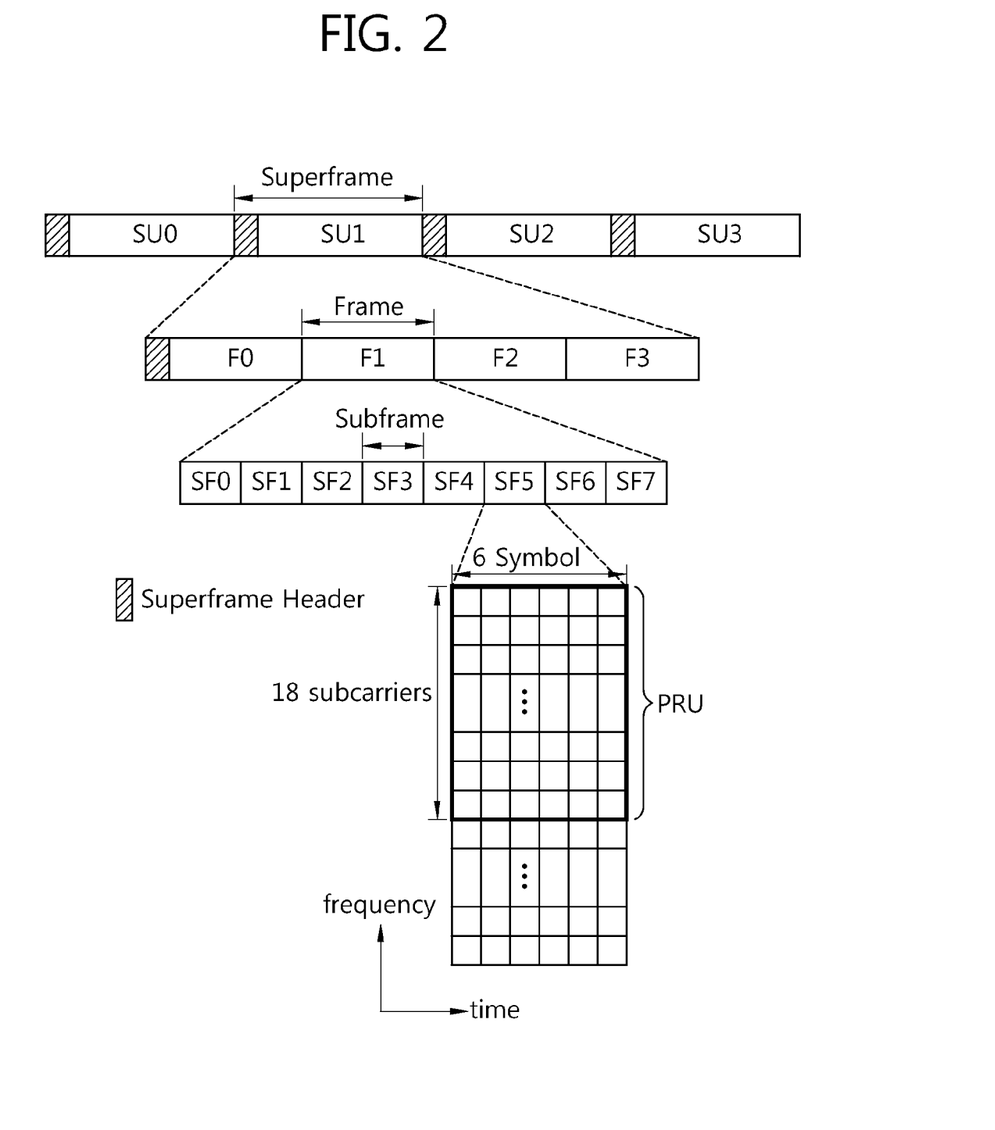
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | | | | | | |
|---|---|---|---|---|---|---|---|
| Channel bandwidth, BW(MHz) | | | 5 | 7 | 8.75 | 10 | 20 |
| Sampling factor, n | | | 28/25 | 8/7 | 8/7 | 28/25 | 28/25 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time, Tb(μs) | | | 91.4 | 128 | 102.4 | 91.4 | 91.4 |
| G = 1/8 | Symbol time, Ts(μs) | | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, Ts(μs) | | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| G = 1/4 | Symbol time, Ts(μs) | | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)× 8000. A subcarrier spacing is defined as $\Delta f = F_s/N_{FFT}$. A useful symbol time is defined as Tb=1/Δf. A CP time is defined as Tg=G·Tb. An OFDMA symbol time is defined as Ts=Tb+Tg. A sampling time is defined as Tb/NFFT.

Figure 3:
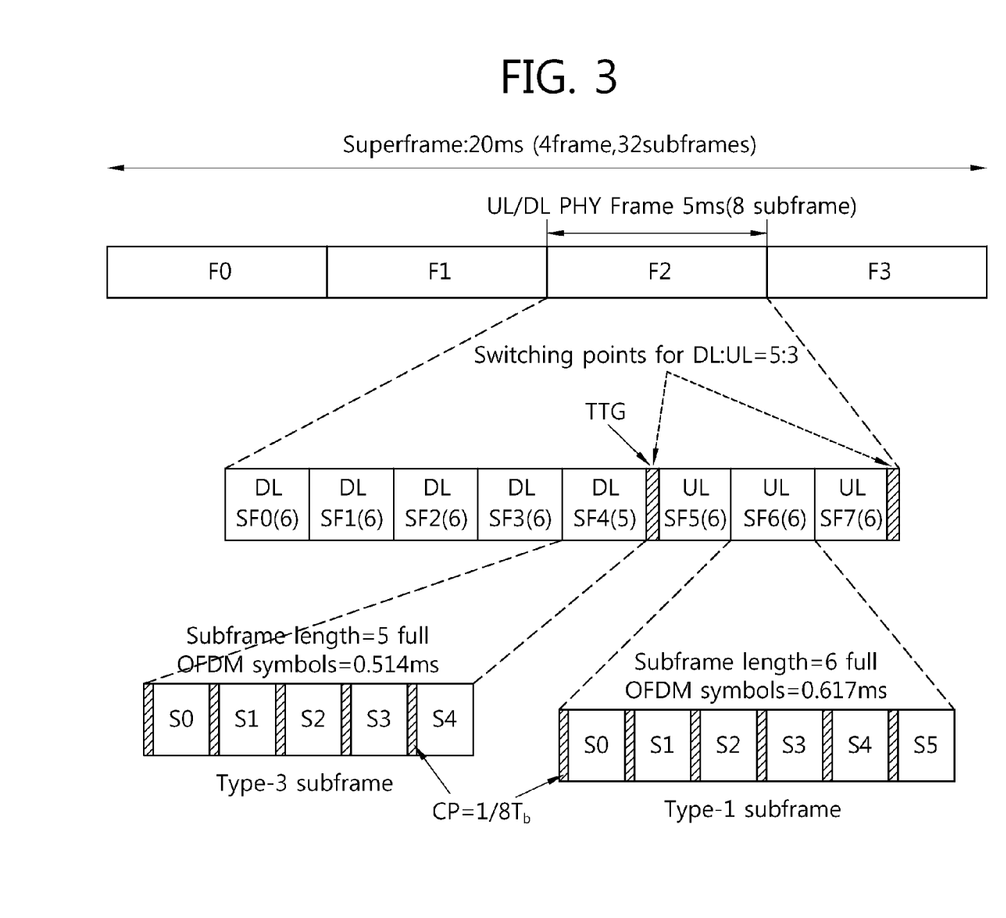
FIG. 3 shows an example of a TDD frame structure.

FIG. 3 shows an example of a TDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and a ratio of a DL subframe to a UL subframe is 5:3. The TDD frame structure of FIG. 3 can be used when a bandwidth is 5 MHz, 10 MHz, or 20 MHz. The last DL subframe SF4 includes 5 OFDM symbols, and the remaining subframes include 6 subframes.

The aforementioned frame structures can apply between a BS and a macro MS. However, when a wireless communication system includes an RS, it is difficult to apply to the RS the same frame structure applied between the BS and the macro MS. The RS requires a radio resource region for DL transmission with respect to a relay MS connected to the RS. Further, since the RS receives a signal from the relay MS and thereafter decodes and transmits it to the BS, the RS requires a radio resource region for UL transmission. The RS can transmit a signal to an MS connected to the RS or can receive a signal from the BS in the same frequency band. Further, the RS can receive a signal from the MS connected to the RS or can transmit a signal to the BS in the same frequency band. Therefore, the RS requires a transition gap when switching a transmission/reception operation of a signal. In general, it is assumed that the RS cannot transmit or receive a signal in the transition gap.

As a preamble, the RS can use a unique sequence different from that used in the BS. In this case, by analyzing a sequence received through the preamble, the MS can know whether the MS receives a service provided by the BS or the RS. This is referred to as awareness. Since the MS can be aware of whether the MS receives the service provided by the RS, the RS can use a frame structure different from that used in the BS. A frame structure for the RS may include a subframe including a transition gap. In communication between the RS and the MS, the MS may perform transmission and reception of signals according to a frame structure different from a frame structure used for communication with the BS. If the MS is not aware of whether the MS receives the service provided by the BS or the RS, the frame structure and the transition gap have to be determined so that the MS can use a service of the RS without any difference from the BS. In this case, the frame structure between the RS and the BS may be different from the frame structure between the MS and the BS. The RS receives frame configuration information regarding an RS frame from the BS, and configures the RS frame according to the frame configuration information. In the RS frame, the frame configuration information may include information indicating a radio resource region for communication with the relay MS and a radio resource region for communication with the BS. The BS can transmit the frame configuration information by including it in DL control information. For example, the frame configuration information can be transmitted by being included in a superframe header (SFH). In this case, the frame configuration information can apply to a plurality of frames. The RS frame configured according to the frame configuration information will be described below in detail. The RS transmits or receives a signal to the MS connected to the RS or to the BS according to the configured RS frame structure.

Figure 4:
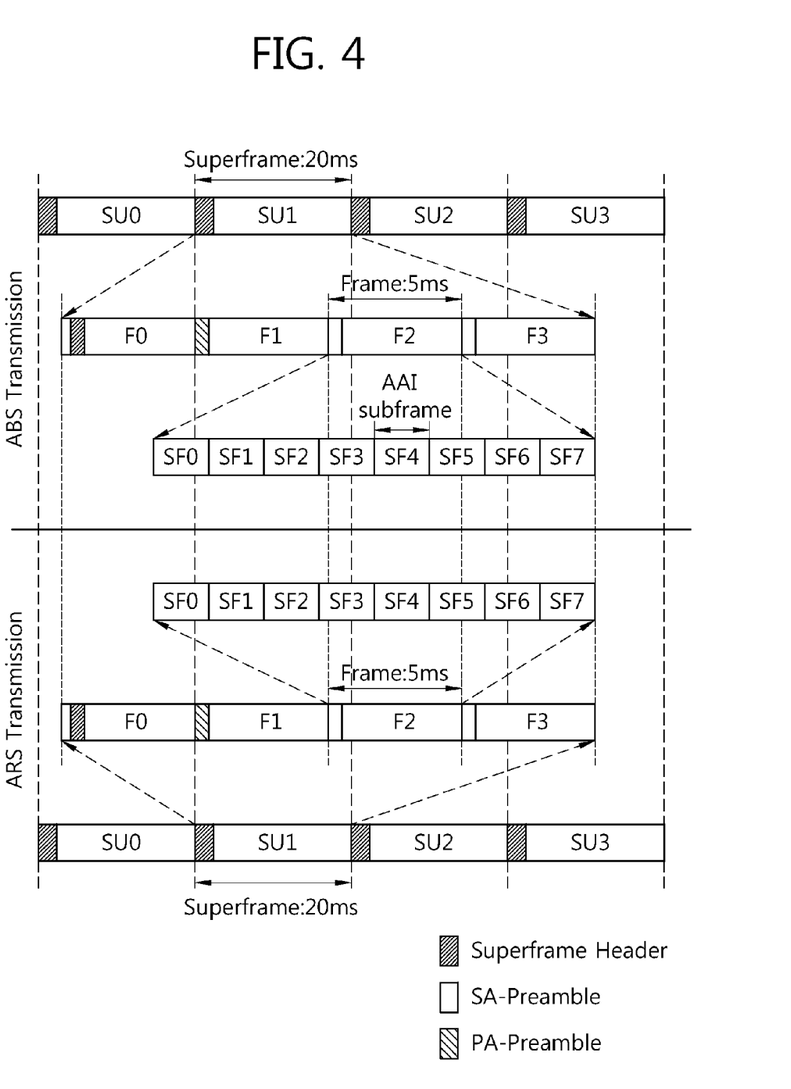
FIG. 4 shows an example of a frame structure of a system including an RS.

FIG. 4 shows an example of a frame structure of a system including an RS.

OFDMA parameters of Table 1 can be directly used in the system including the RS. Superframes of a BS and an MS can be time aligned, and include the same number of frames and subframes. Each RS superframe includes an SFH. An SFH transmitted by the RS has the same location and the same format as an SFH transmitted by the BS. An RS preamble (i.e., SA-preamble and PA-preamble) and a super-ordinate BS preamble are transmitted simultaneously.

The RS conforms to a frame structure of a basic IEEE 802.16m system. In a simultaneous transmit receive (STR) relay, a BS-RS frame structure and an RS-MS frame structure are the same as a BS-MS frame structure. In a time-division transmit and receive (TTR) relay, a BS-RS frame and a MS frame are transmitted by using time division multiplexing. Hereinafter, the TTR relay will be described.

In the system supporting the RS, the BS frame is divided into an access zone and a relay zone. In the frame, the access zone can be located ahead of the relay zone. Alternatively, in the FDD system, the relay zone can be located ahead of the access zone in a UL frame. A duration of the access zone and the relay zone is different between DL and UL. The access zone and the relay zone can be configured by using an AAI_ARS-CONFIG-CMD message transmitted by the BS.

In a BS frame, an access zone consists of a DL access zone and a UL access zone, and a relay zone consists of a DL relay zone and a UL relay zone. The BS frame access zone is used to communicate with only the MS. The BS frame relay zone can be used to communicate with the RS, and can be used to communicate with the MS. In the DL relay zone, the BS transmits a signal to a sub-ordinate RS. In the UL relay zone, the BS receives a signal from the sub-ordinate RS.

In an RS frame, an access zone consists of a DL access zone and a UL access zone, and a relay zone consists of a DL relay zone and a UL relay zone. The RS frame access zone is used to communicate with only the MS. In the DL relay zone, the RS receives a signal from a super-ordinate BS. In the UL relay zone, the RS transmits a signal to the super-ordinate BS. When the RS or the MS receives a frame configuration index through an S-SFH SP1, DL/UL access and relay zones are configured in a frame.

A transmit/receive transition gap (TTG) is located between a DL region and a UL region. A receive/transmit transition gap (RTG) is located between the UL region and a subsequent frame. In order to avoid inter-symbol interference, an idle time may be included in the TTG or the RTG according to a CP size.

The transition gap may be a relay transmit to receive transition interval (R-TTI) or a relay receive to transmit transition interval (R-RTI). The R-TTI is a time that can be inserted while switching is performed from an operation of transmitting a signal by the RS to the relay MS to an operation of receiving signal from the BS. The R-TTI may be one symbol. The R-RTI is a time that can be inserted while switching is performed from an operation of receiving a signal by the RS from the relay MS to an operation of transmitting a signal to the BS. The R-RTI may be one symbol. The R-TTI may be determined such that a round trip delay (RTD) and an ARS transmit/receive transition gap (ARSTTG) between the RS and a super-ordinate station of the RS can be aligned. The R-RTI may be determined such that an RTD and an ARS receive/transmit transition gap (ARSRTG) between the RS and the super-ordinate station of the RS can be aligned.

Meanwhile, an MS that receives a service not by an RS but by a BS can transmit and receive data according to a frame structure of the BS irrespective of a conventional frame structure of the RS.

Figure 5:
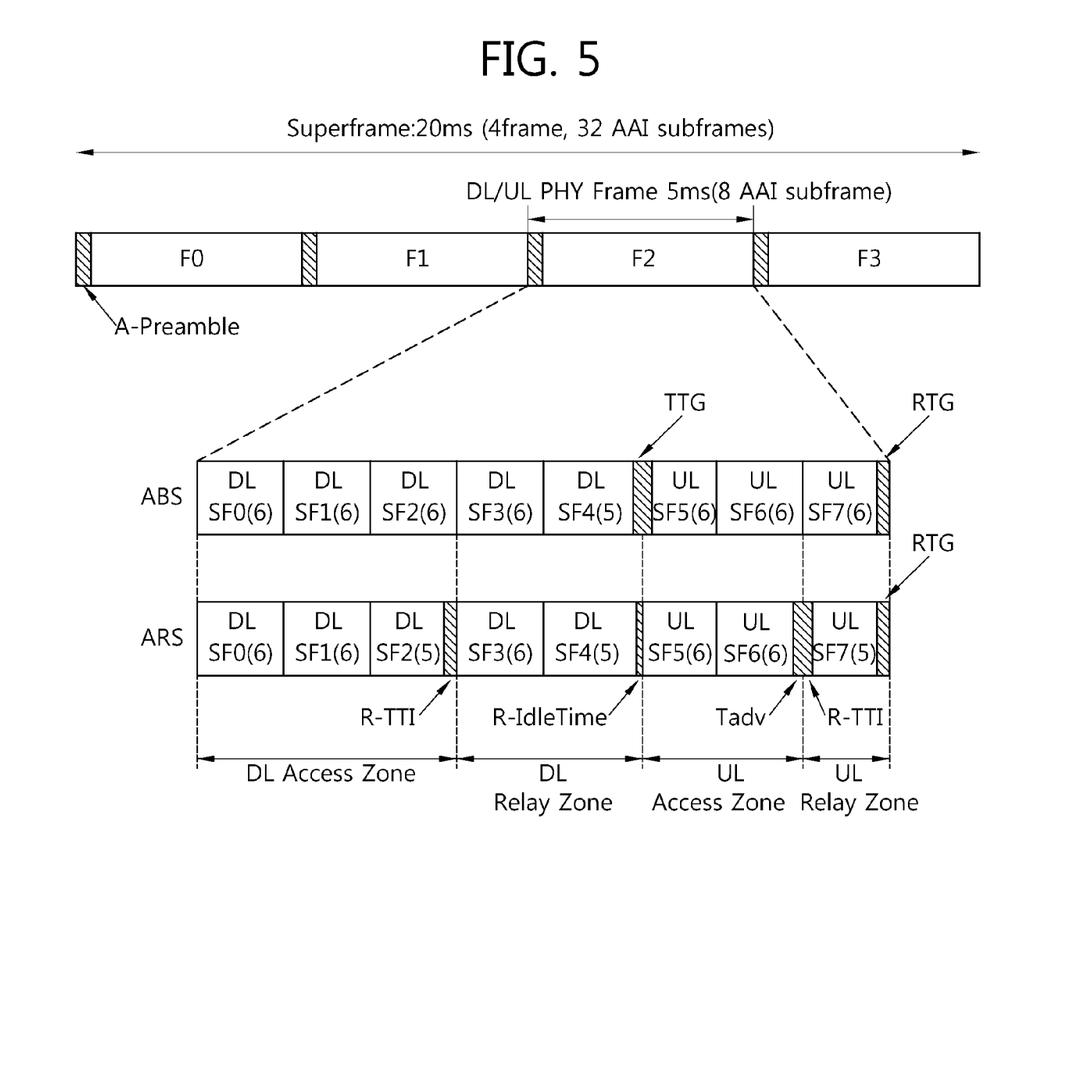
FIG. 5 shows an example of a TDD frame in a wireless communication system including an RS.

FIG. 5 shows an example of a TDD frame in a wireless communication system including an RS. The TDD frame structure of FIG. 5 may be a frame structure in case of G=1/8, and can be used in various bandwidths, i.e., 5 MHz/10 MHz/20 MHz. The number of DL subframes and the number of UL subframes are respectively 5 and 3 in the TDD frame. The number of DL relay zones is 2. The number of UL relay zones is 1.

Referring to FIG. 5, an idle time (R_IdleTime) is allocated at a time at which DL transmission transitions to UL transmission in each RS frame. A duration time of the idle time can be transmitted from the RS to a UE through an AAI_SCD message. The duration time of the idle time is equal to or less than TTG. A UL frame of the RS can start in advance of a UL frame of a BS, and an advanced time can be denoted by $T_{adv}$. A sum between $T_{adv}$ and R_IdleTime may be TTG. In addition, RTG is allocated at a time when UL transmission transitions to DL transmission in each RS frame.

Figure 6:
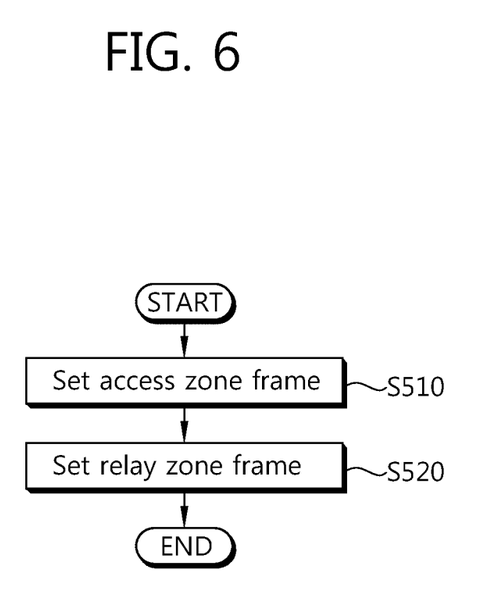
FIG. 6 is a flowchart showing a method of setting a frame according to the present invention.

In addition, R-TTI is allocated between a DL access zone and a DL relay zone in a DL region. The R-TTI may be located in a last OFDMA symbol of a last subframe of the DL access zone. In a UL region, R-RTI is allocated between a UL access zone and a UL relay zone. The R-RTI may be located in a last OFDMA symbol of a last subframe of the UL access zone. The aforementioned RS frame configuration can be performed by using an ARS-CONFIG-CMD message among media access control (MAC) control messages. The BS configures an operational parameter of a physical layer of the RS by using the ARS-CONFIG-CMD message. Table 2 shows an example of the ARS-CONFIG-CMD message.

to a UE and a UL access zone in which the UE transmits a signal to the BS or the RS. In addition, a relay zone frame is set (step S520). The relay zone frame includes a DL relay zone in which the BS transmits a signal to the UE or the RS and a UL relay zone in which the UE or the RS transmits a signal to the BS.

In this case, the frame can be included in a superframe, and when the frame of the RS is set in the superframe, the frame can be set such that the access zone frame and the relay zone frame are separate frames, and the two frames are contiguous. That is, the frame can be set such that the access zone and the relay zone are distinguished for each frame.

For example, the frame can be set such that the RS transmits the frame to the UE or receives the frame from the UE in an even frame and receives the frame from the BS or transmits the frame to the BS in an odd frame. In this case, the frame may be a TDD frame, and a TDD duration may be a plurality of frames.

Figure 7:
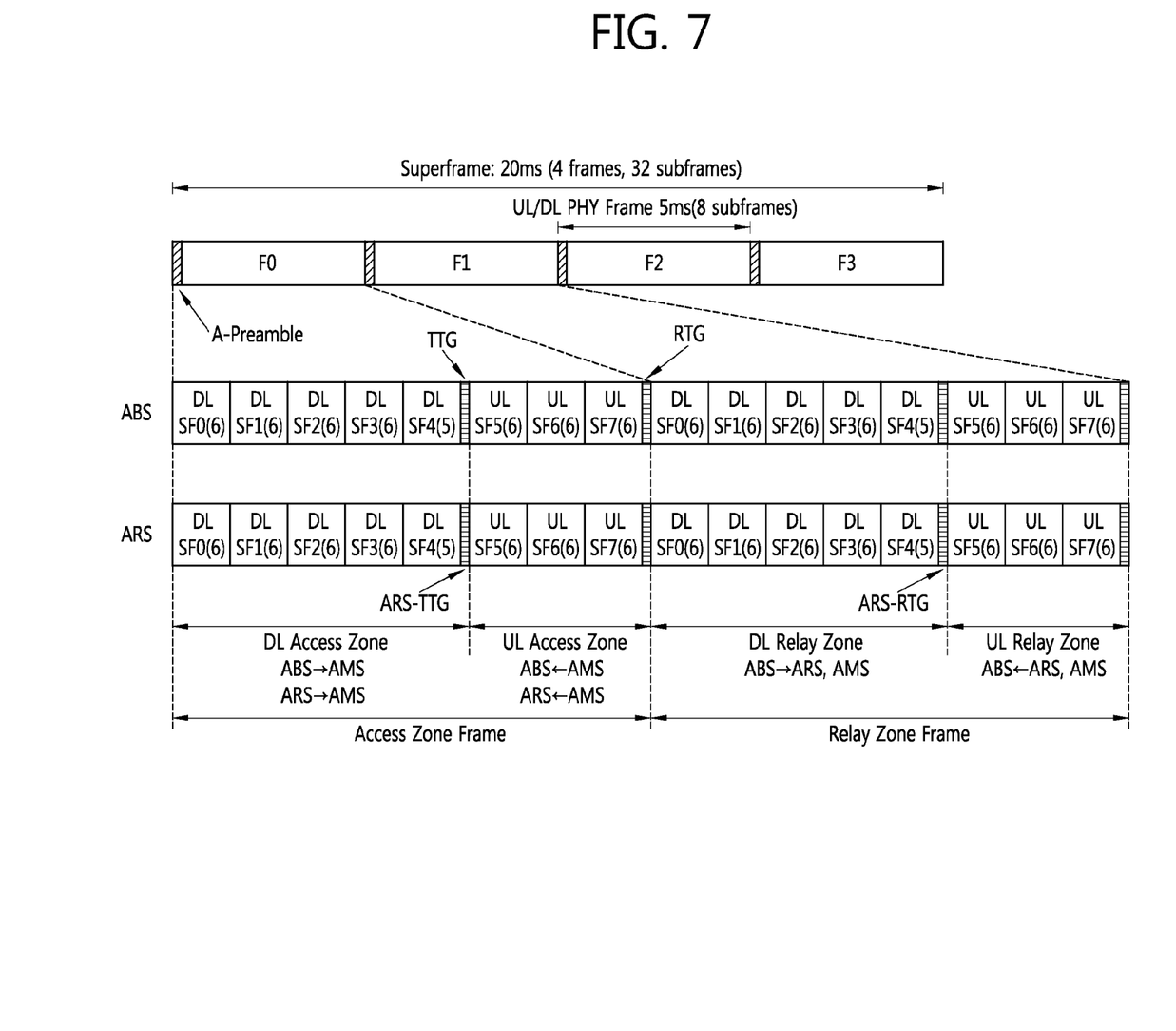
FIG. 7 shows an example of a method of setting an RS frame according to the present invention.

FIG. 7 shows an example of a method of setting an RS frame according to the present invention.

Referring to FIG. 7, it is characterized in that a UL access zone and a DL access zone are included in one frame and a UL relay zone and a DL relay zone are included in one frame. In this case, it can be configured that the access zone is included in a frame located before the relay zone. For example, the DL access zone may include 5 DL subframes, and the UL access zone may include 3 UL subframes. Of course, the number of subframes is not limited thereto. Likewise, the DL relay zone may include 5 DL subframes, the UL relay zone may include 3 UL subframes, and the number of subframes is not limited thereto.

In case of a BS, TTG is allocated between a DL subframe and a UL subframe in one frame, and RTG is allocated between the UL subframe and the DL subframe. That is, TTG

TABLE 2

| Attributes | Size (bits) | Value/Note |
|---|---|---|
| 16m_DL_Relay_zone_duration | 3 | The duration of the 16 m DL Relay zone in units of subframes. |
| 16m_UL_relay-zone_duration | 3 | The duration of the 16 m UL Relay zone in units of subframes. |
| 16m_Relay_zone_AMS_allocation_indicator | 1 | The indicator which signalizes if the ABS may allocated resources to the AMS in the 16 m Relay zone and 16 m UL Relay zone. |
| MIMO Midamble indication in DL relay zone | 1 | 0b0: MIMO midamble is not transmitted in DL Relay zone<br>0b1: MIMO midamble is transmitted in DL Relay zone |

In Table 2, the 16m_DL_relay_zone_duration field indicates an allocation duration of a DL relay zone in a superframe unit, and the 16m_UL_Relay_zone_duration field indicates an allocation duration of a UL relay zone in a superframe unit. The 16m_Relay_zone_AMS_allocation indicator field may be an indicator indicating whether the BS allocates a resource to the MS in the DL relay zone and the UL relay zone. The MIMO midamble indication in AAI DL Relay zone field indicates whether an R-amble is transmitted in the DL relay zone.

Hereinafter, a method of setting a frame according to the present invention will be described.

FIG. 6 is a flowchart showing a method of setting a frame according to the present invention.

Referring to FIG. 6, first, an access zone frame is set in a frame of an RS (step S510). The access zone frame includes a DL access zone in which a BS or the RS transmits a signal is allocated between a DL subframe and a UL subframe in frames F0 and F1, and RTG is allocated between frames F0 and F1. On the other hand, in case of an RS, TTG is allocated between a DL relay zone and a UL access zone and RTG is allocated between a DL access zone and a UL access zone. Likewise, transition intervals can be allocated by using a transition interval duration of the BS.

Figure 8:
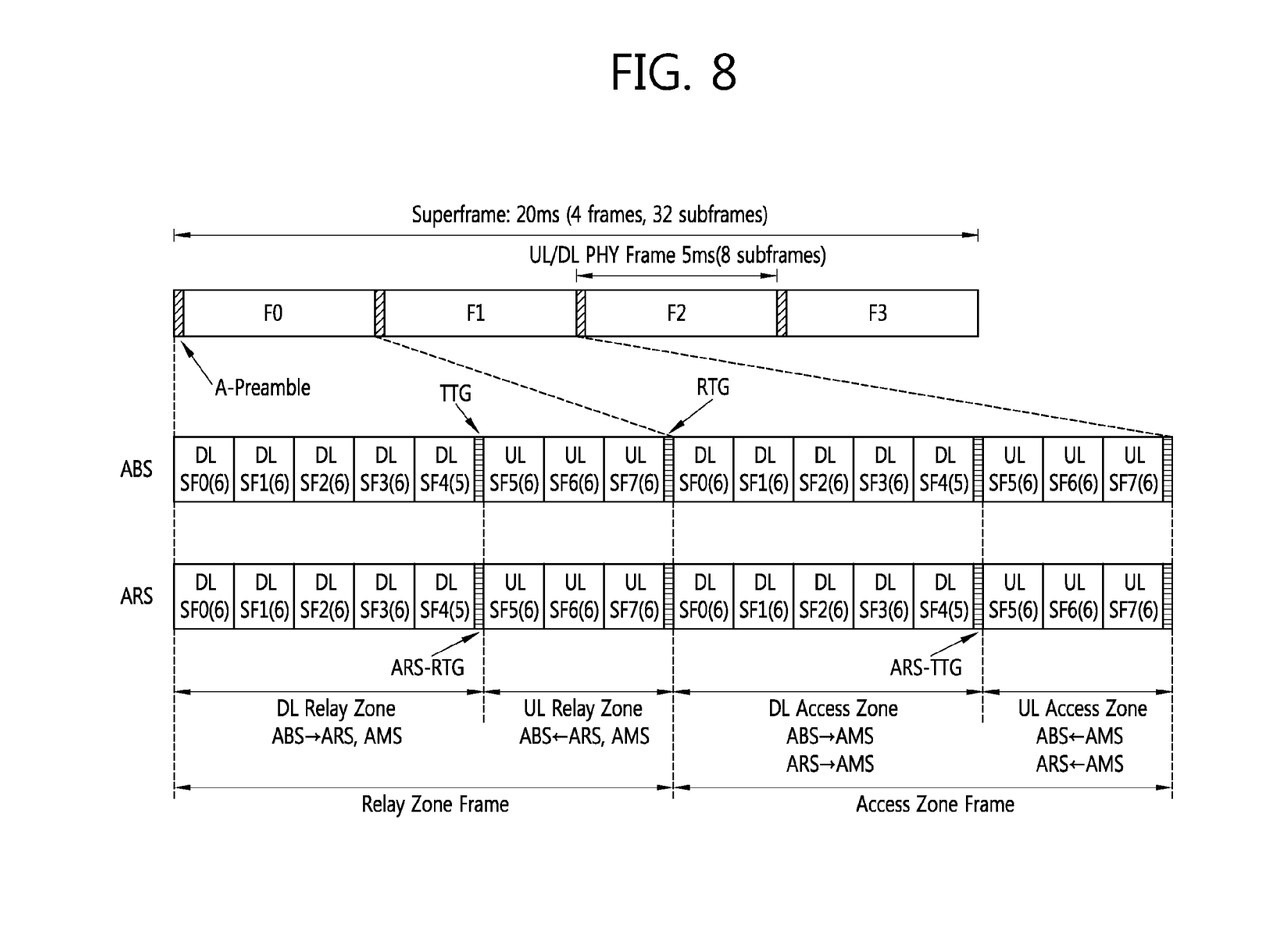
FIG. 8 shows another example of a method for setting an RS frame according to the present invention.

FIG. 8 shows another example of a method for setting an RS frame according to the present invention.

Referring to FIG. 8, it is characterized in that a UL access zone and a DL access zone are included in one frame and a UL relay zone and a DL relay zone are included in one frame. In this case, it can be configured such that the relay zone is included in a frame located before the access zone.

In case of a BS, TTG is allocated between a DL subframe and a UL subframe in one frame, and RTG is allocated between the UL subframe and the DL subframe. That is, TTG is allocated between a DL subframe and a UL subframe in frames F0 and F1, and RTG is allocated between frames F0 and F1. On the other hand, in case of an RS, RTG is allocated between a DL relay zone and a UL access zone, and TTG is allocated between a DL access zone and a UL access zone. Likewise, transition intervals can be allocated by using a transition interval duration of the BS.

As such, when setting a frame according to the present invention, allocation can be performed by using a transition interval of the BS without having to additionally insert a transition interval for the RS. Accordingly, a radio resource can be effectively used. In the conventional TDD frame of FIG. 5, R-TTI or R-RTI is allocated to a region other than a region to which TTG or RTG of the BS is allocated. Accordingly, a region in which data must be transmitted is used as the transition interval, and there is a waste of resource. In addition, a signal for reporting whether the transition interval exists needs to be transmitted, which may result in the increase in a signaling overhead. On the other hand, when an access zone and a relay zone are allocated for each frame according to the proposed invention, the transition interval is allocated to a region in which TTG and RTG of the BS are allocated, and thus a radio resource can be effectively used. Further, the BS does not need to transmit an additional midamble (e.g., R-amble) to the RS. This is because the RS transmits its midamble in an access zone, and a midamble of the BS is received by the RS. Further, it has no influence on the support of the RS. Therefore, since transition can be performed by using only the transition interval between frames, there is an advantage in that a loss caused by the transition interval is decreased.

In addition, since there is an advantage in that the RS can operate by changing only a usage without having to change a frame structure of the BS, the BS can operate in the same manner as when the RS does not exist.

Figure 9:
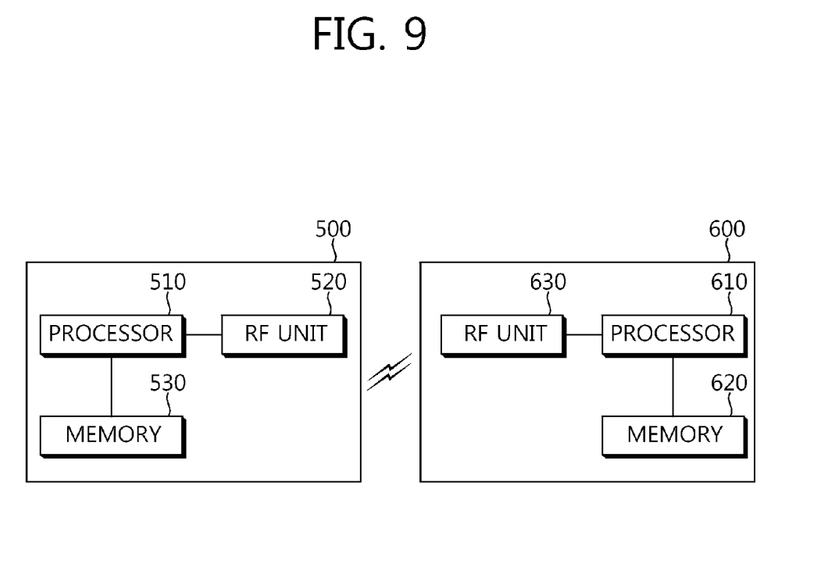
FIG. 9 is a block diagram showing a structure of a BS and an RS according to the present invention.

FIG. 9 is a block diagram showing a structure of a BS and an RS according to the present invention.

ABS 500 includes a processor 510, a memory 530, and a radio frequency (RF) unit 520. The processor 510 performs scheduling to allocate a radio resource to an RS and to receive a signal from the RS. The processor 510 can implement procedures, methods, and functions performed by the BS in the aforementioned embodiments. The memory 530 is coupled to the processor 510, and stores a variety of information for driving the processor 510. The RF unit 520 is coupled to the processor 510 and transmits and/or receives a radio signal.

An RS 600 includes a processor 610, a memory 620, and an RF unit 630. The processor 610 can implement procedures, methods, and functions performed by the RS in the aforementioned embodiments. According to the present invention, the processor provides control to configure and transmit a frame of the RS. The memory 620 is coupled to the processor 610, and stores a variety of information for driving the processor 610. The RF unit 630 is coupled to the processor 610 and transmits and/or receives a radio signal.

The processors 510, 610 may include application-specific integrated circuit (ASIC), other chipset, logic circuit and/or data processing device. The memories 520, 620 may include read-only memory (ROM), random access memory (RAM), flash memory, memory card, storage medium and/or other storage device. The RF units 530, 630 may include baseband circuitry to process radio frequency signals. When the embodiments are implemented in software, the techniques described herein can be implemented with modules (e.g., procedures, functions, and so on) that perform the functions described herein. The modules can be stored in memories 520, 620 and executed by processors 510, 610. The memories 520, 620 can be implemented within the processors 510, 610 or external to the processors 510, 610 in which case those can be communicatively coupled to the processors 510, 610 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for setting a frame of a relay station in a wireless communication system, wherein a superframe includes four frames, the method comprising:
    setting a first frame of the superframe, which is a leftmost frame of the superframe, and a third frame of the superframe, which is a second frame from the right of the superframe, as an access zone frame including a downlink (DL) access zone in which a base station or the relay station transmits a first signal to a user equipment and an uplink (UL) access zone in which the user equipment transmits a second signal to the base station or the relay station; and
    setting a second frame of the superframe, which is a second frame from the left of the superframe, and a fourth frame of the superframe, which is a rightmost frame of the superframe, as a relay zone frame including a DL relay zone in which the base station transmits a third signal to the user equipment or the relay station and a UL relay zone in which the user equipment or the relay station transmits a fourth signal to the base station,
    wherein an advanced relay station-transmit/receive transition gap (ARS-TTG) is allocated between a last DL subframe of the DL access zone and a first UL subframe of the UL access zone, and
    wherein an advanced relay station-receive/transmit transition gap (ARS-RTG) is allocated between a last DL subframe of the DL relay zone and a first UL subframe of the UL relay zone.

2. The method of claim 1, wherein the access zone frame and the relay zone frame each include 8 subframes.

3. An apparatus for transmitting a frame, wherein a superframe includes four frames, the apparatus comprising:
    a radio frequency (RF) unit for transmitting or receiving a radio signal; and
    a processor coupled to the RF unit,
    wherein the processor is configured for:
    setting a first frame of the superframe, which is a leftmost frame of the superframe, and a third frame of the superframe, which is a second frame from the right of the superframe, as an access zone frame including a downlink (DL) access zone in which a base station or the relay station transmits a first signal to a user equipment and an uplink (UL) access zone in which the user equipment transmits a second signal to the base station or the relay station; and setting a second frame of the superframe, which is a second frame from the left of the superframe, and a fourth frame of the superframe, which is a rightmost frame of the superframe, as a relay zone frame including a DL relay zone in which the base station transmits a third signal to the user equipment or the relay station and a UL relay zone in which the user equipment or the relay station transmits a fourth signal to the base station, wherein an advanced relay station-transmit/receive transition gap (ARS-TTG) is allocated between a last DL subframe of the DL access zone and a first UL subframe of the UL access zone, and wherein an advanced relay station-receive/transmit transition gap (ARS-RTG) is allocated between a last DL subframe of the DL relay zone and a first UL subframe of the UL relay zone.

* * * * *